Sept. 26, 1950     N. E. SPRECHER     2,523,339
WAVE FORM DEMONSTRATOR
Filed May 7, 1946
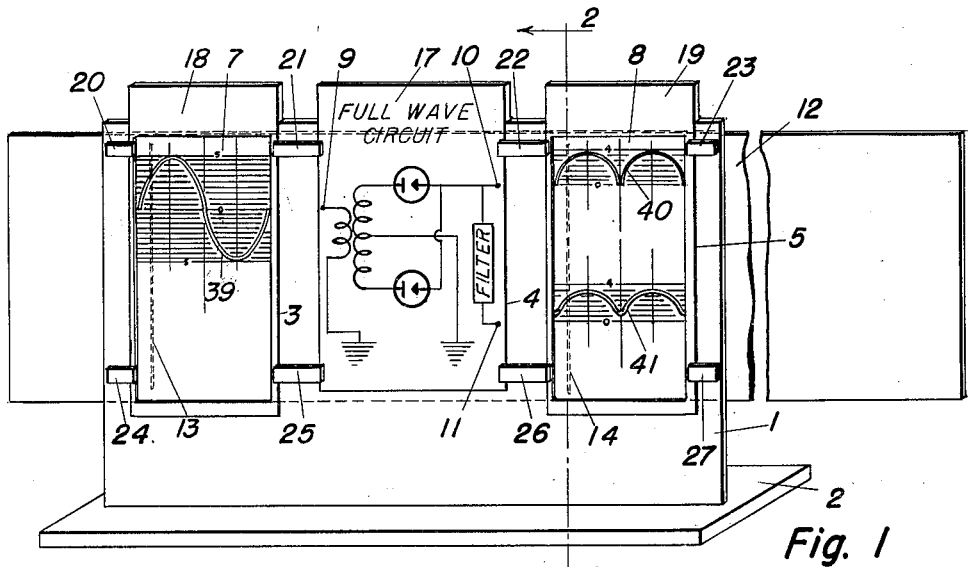
Fig. 1
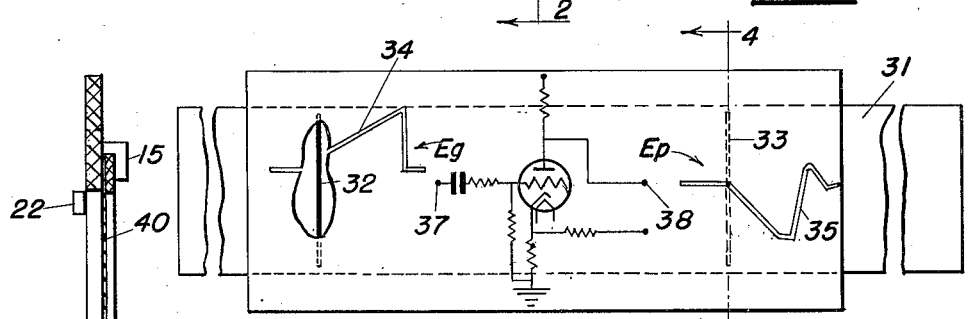
Fig. 3
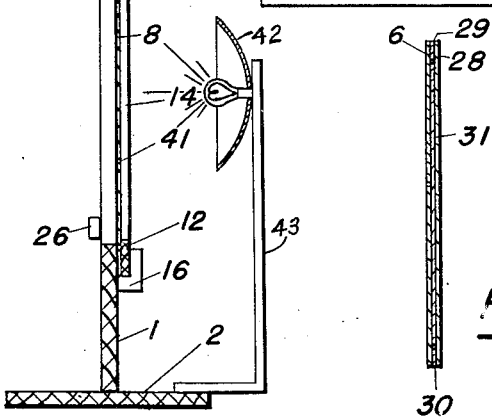
Fig. 2
Fig. 4
Inventor
Noah E. Sprecher
Attorney Patented Sept. 26, 1950

2,523,339

UNITED STATES PATENT OFFICE 2,523,339

WAVE FORM DEMONSTRATOR

Noah E. Sprecher, Hawthorne, Calif.

Application May 7, 1946, Serial No. 667,780

1 Claim. (Cl. 35—19)

(Granted under the act of March 3, 1883, as amended April 30, 1928; 370 O. G. 757)

This invention relates to educational devices for demonstrating simultaneous corresponding reactions at two or more points in a system of related operating parts. For purposes of illustration it is here shown as applied to electronic tube circuits, to demonstrate the simultaneous variations in potential, current, etc. in the input, output and/or intermediate points of a system including electronic tubes.

The object of this invention, broadly, is to demonstrate visually instantaneous values or relative positions of parts of a device at various points thereof.

More specifically, as illustrated in this application, the object is to simultaneously show instantaneous values of potential or current, etc. at various points in an electrical system, especially where electronic tubes are included.

Another object is to construct simple means for visually indicating corresponding changes in electrical conditions at a plurality of different points in an electronic circuit or system of related circuits.

Another object is to visually show on a chart the instantaneous conditions at various points in transmitting and receiving radio circuits simultaneously with the travel of an impulse through space between these circuits.

Other and more specific objects will appear in the following detailed description of some illustrative forms of the invention, having reference to the accompanying drawings, wherein Figs. 1 and 2 are a perspective and section view respectively of one form of device as applied to simple tube circuits; and Figs. 3 and 4 show front and end views of another simpler form of device made in accordance with this invention.

The wave form demonstrators illustrated herein consist of a schematic diagram of a simple piece of electronic equipment showing wave forms obtained at various points in the circuit. A means is provided to show the corresponding instantaneous values on all the wave forms at any instant throughout a cycle of operation. The wave forms in the device shown in Figs. 1 and 2 are in the form of slits cut in paper masks which are attached to windows insertable in the device. The slits are cut in the forms of the respective waves. Narrow vertical slits of light are made to move behind the masks which produce bright spots on the wave forms indicating the instantaneous corresponding values of the potential, current, or other characteristics represented by the respective wave forms.

Fig. 1 is a perspective illustration of a simple demonstrator having an upright frame 1 mounted on base 2 with cut-out portions 3, 4 and 5. The middle cut-out portion 4 has inserted in it a board 17 with a schematic diagram of a simple circuit, the operation of which is to be demonstrated. In the cut-out portions 3 and 4 on each side of this diagram are inserted the window frames 18 and 19, over the windows of which are fastened the sheets 7 and 8 having wave form slits 39, 40 and 41 cut therein representing one complete cycle in the operation of this circuit. The wave form represented on sheet 7 indicates the variation in the potential applied at the point 9 in the schematic diagram as a result of connection to an alternating current source. The wave forms shown on sheet 8 represent the potential obtained at the points 10 and 11 respectively in the circuit diagram. The circuit represents a full wave rectifier with a filter for reducing the fluctuation in the output potential. The cardboard slide 12 has narrow vertical slits 13 and 14 therein horizontally spaced at a distance equal to that between the cut-out portions 3 and 5 in the upright frame, so that as one slit is moved horizontally across one cut-out space, the other slit will move correspondingly across he other cut-out space. The cardboard slide 12 is extended at each end beyond the corresponding vertical slot a distance sufficient to cover the windows in all positions of the vertical slot with respect to the respective windows, and is slidable within a pair of guide rails 15 and 16 at the top and bottom respectively of the upright frame. The guide rails 15 and 16 also serve as guides for the rear faces of the window frames and the diagram board 17 in the cut-out portions. The front of the window frames and diagram board are guided by strips 20, 21, 22 and 23 near the top of the upright frame, and strips 24, 25, 26 and 27 near their bottom ends. The sheets 7 and 8 and their wave forms are so formed and positioned in the window frames 18 and 19 that the slits 13 and 14 will maintain a position with respect to the wave forms so as to always intersect them at corresponding instantaneous values in the circuit represented by the respective wave forms in accordance with a specific operation of the circuit. Thus, as shown in Fig. 1, the instantaneous values of the input potential at point 9 in the circuit represented by the intersection of slit 13 and the wave form in frame 18 corresponds to the instantaneous values of potential at points 10 and 11 in the circuit represented by the simultaneous intersections of the slits 14 with the wave forms at the top and bottom of the window frame 19 representing those values respectively. As the cardboard 12 with these slits 13 and 14 is moved horizontally, these intersections of the vertical slits with the several wave forms will continuously indicate the simultaneous corresponding instantaneous values of the potentials at these three points, as would be obtained in the normal operation of the circuit illustrated. These indications would be obtained by showing moving spots of light at such intersections having their source of light supplied by a suitable lamp 42 mounted on standard 43 at the back of the frame 1. This lamp may be omitted and any other source of light, such as a window, may be used in its place with equal effect.

The form of demonstrator illustrated in Figs. 3 and 4 is even simpler in form in that it is composed merely of 2 sheets of paper 6 and 28 fastened together by spacers 29 and 30 at the top and bottom thereof respectively providing for a slide between them in which a stiff sheet of paper 31 is slidably mounted and has two vertical lines 32 and 33, portions of which may be seen from the front of the device through slits 34 and 35 representing corresponding wave forms obtained in normal operation at two points 37 and 38 in a circuit schematically illustrated on the face of the device. The wave forms in the illustration represent the potentials at the points 37 and 38 in a simple amplifier tube circuit. The wave forms 34 and 35 are so shaped and spaced that as the stiff paper 31 is slid horizontally from side to side, the lines 32 and 33 will present a moving point along the wave forms indicating corresponding instantaneous values of the potentials at the two points 37 and 38.

Obviously, wave forms may be provided for an entire radar indicator schematic on one demonstrator. Lines may be used in the back of the indicator for all the wave forms and the vertical slits may all be ganged together in the same manner, so that the wave forms all maintain a spot in their proper relative instantaneous values. Other obvious modifications may be made without departing from the spirit and scope of this invention.

The use of these demonstrators enables a student to more clearly understand the time sequence of the entire circuit and to understand the effect of each individual circuit on following circuits. The use of these demonstrators also lessens the burden on the instructor in that a cycle of operation can be gone over as slowly as desired, or the cycle can be stopped at any point for discussions. The simple demonstrators shown in the drawing are merely for illustrative purposes and are not intended to limit the scope of the invention as defined in the appended claim.

The invention described herein may be manufactured and used by or for the Government of the United States of America for governmental purposes without the payment of any royalties thereon or therefor.

What is claimed is:

Circuit study apparatus comprising a base member, frame means mounted on said base member, a plate removably mounted on said frame means and having a circuit diagram formed thereon, a pair of sheets removably mounted on said frame means on opposite sides of said plate respectively, said sheets having slits therein cut in the form of waves representing the cyclic variation of at least one characteristic at different locations in the circuit diagram, the wave forms having equal time bases, and an additional plate slidably mounted on said frame means back of said sheets and having parallel slits therein normal to said bases and spaced in accordance with the spacing between the wave forms, said additional plate being slidable in a direction parallel to said bases whereby upon sliding of said additional plate parallel slits will present moving points along the wave form slits, said points corresponding to the instantaneous values of the characteristic at the respective locations in the circuit diagram.

NOAH E. SPRECHER.

REFERENCES CITED

The following references are of record in the file of this patent:

UNITED STATES PATENTS

| Number | Name | Date |
|---|---|---|
| 1,889,438 | Games | Nov. 29, 1932 |
| 2,203,594 | Daugherty | June 4, 1940 |
| 2,208,503 | Manuel | July 16, 1940 |
| 2,236,217 | Manuel | Mar. 25, 1941 |
| 2,376,586 | Diller | May 22, 1945 |

FOREIGN PATENTS

| Number | Country | Date |
|---|---|---|
| 214,025 | Great Britain | Apr. 17, 1924 |
| 518,731 | Great Britain | Mar. 6, 1940 |